United States Patent
Ono (10) Patent No.: US 7,319,778 B2
(45) Date of Patent: Jan. 15, 2008

(54) IMAGE PROCESSING APPARATUS

(75) Inventor: Shuji Ono, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 550 days.

(21) Appl. No.: 10/322,711

(22) Filed: Dec. 19, 2002

(65) Prior Publication Data

US 2003/0133613 A1  Jul. 17, 2003

(30) Foreign Application Priority Data

Jan. 15, 2002 (JP) ............................. 2002-006809

(51) Int. Cl.
*G06K 9/00* (2006.01)
(52) U.S. Cl. .................... 382/118; 382/117; 382/209
(58) Field of Classification Search ................ 382/117, 382/118, 209
See application file for complete search history.

(56) References Cited

U.S. PATENT DOCUMENTS

| 4,797,941 | A  * | 1/1989 | Lloyd et al. | ................. | 382/205 |
| 6,295,374 | B1 * | 9/2001 | Robinson et al. | ........... | 382/218 |
| 6,594,629 | B1 * | 7/2003 | Basu et al. | ................. | 704/251 |
| 6,678,414 | B1 * | 1/2004 | Loce et al. | ................. | 382/209 |
| 6,964,023 | B2 * | 11/2005 | Maes et al. | ................. | 715/811 |

FOREIGN PATENT DOCUMENTS

| JP | 4-148384 A | 5/1992 |
| JP | 4-211874 A | 8/1992 |
| JP | 05-174149 | 7/1993 |
| JP | 7-302327 A | 11/1995 |
| JP | 10-222678 A | 8/1998 |

\* cited by examiner

*Primary Examiner*—Bhavesh M Mehta
*Assistant Examiner*—John B Strege
(74) *Attorney, Agent, or Firm*—Sughrue Mion, PLLC (57) ABSTRACT

An image processing apparatus for detecting a desired image-element from a given image, includes: a storing unit for storing a plurality of first templates indicating the desired image-element and a plurality of second templates stored corresponding to the first templates, each of the second templates indicating a part of a corresponding one of the first templates; the first comparing unit for selecting any of the first templates and comparing the selected first template with the given image; and the second comparing unit for comparing a second template corresponding to the selected first template selected by the first comparing unit with the given image; and a detecting unit for detecting the desired image-element from the given image based on the comparison results by the first and second comparing units.

8 Claims, 10 Drawing Sheets

FIG. 4A — DETECTED

FIG. 4B $\rho_{1,1}=0.98$

*FIG. 5A*

$\rho_{2,1} = 0.85$  $\rho_{2,2} = 0.7$

*FIG. 5B*

$\rho_{3,1} = 0.7$  $\rho_{3,2} = 0.6$

*FIG. 5C*

$\rho_{4,1} = 0.7$  $\rho_{4,2} = 0.6$

| SOI | START OF COMPRESSED DATA |
|---|---|
| APP1 | APPLICATION MARKER SEGMENT |
| DQT | QUANTIZATION TABLE |
| DHT | HUFFMAN TABLE |
| SOF | FLAME HEADER |
| SOS | SCAN HEADER |
|  | COMPRESSED DATA |
| EOI | END OF COMPRESSED DATA |

EXEMPLARY STRUCTURE OF COMPRESSED DATA

IMAGE PROCESSING APPARATUS

This patent application claims priority from a Japanese patent application No. 2002-006809 filed on Jan. 15, 2002, the contents of which are incorporated herein by reference.

BACKGROUND OF THE INVENTION

1. Field of the Invention

The present invention relates to an image processing apparatus. More particularly, the present invention relates to an image processing apparatus for detecting a desired image-element from a given image.

2. Description of the Related Art

As an image recognition apparatus that identifies an image to be recognized, an apparatus disclosed in Japanese Patent Application Laid-Open No.5-174149 has been conventionally known. This image recognition apparatus converts an object image, that is an object of recognition, into a coarse-mosaic image, and scans an unknown image by using this coarse-mosaic image as a feature of the object image so as to roughly find the position and size of the object image. Then, the image recognition apparatus produces a fine-mosaic image from the object image and scans an area around the position in the unknown image, that was roughly found, so as to find the object image.

In the conventional image recognition apparatus, the number of pixels of the mosaic image used as the feature of the object image is changed in three stages, so as to calculate the distance between the mosaic image and the unknown image in each stage. This image recognition apparatus detects the object image to be recognized based on the thus calculated distance.

The conventional image recognition apparatus, however, stores a plurality of templates for finding the object image to be recognized, and compares the templates with the object image one by one so as to detect the object image to be recognized. Thus, it spends much time to compare the templates with the object image by the conventional image recognition apparatus.

SUMMARY OF THE INVENTION

Therefore, it is an object of the present invention to provide an image processing apparatus, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, an image processing apparatus for detecting a desired image-element from a given image, comprises: a storing unit operable to store a plurality of first templates indicating the desired image-element and a plurality of second templates stored corresponding to the plurality of first templates, each of the second templates indicating a part of a corresponding one of the plurality of first templates; a first comparing unit operable to select any one of the first templates and compare the selected one first template with the given image; and a second comparing unit operable to compare a second template corresponding to the selected one first template selected by the first comparing unit with the given image; and a detecting unit operable to detect the desired image-element from the given image based on the comparison results by the first and second comparing units.

The storing unit may store at least one first template that corresponds to the plurality of second templates.

The storing unit may store at least one second template that corresponds to other one of the second templates.

The second comparing unit may compare each of a plurality ones of the second templates, that correspond to the selected one first template selected by the first comparing unit, with the given image.

The storing unit may store a second template that has a higher resolution than that of the corresponding first template.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
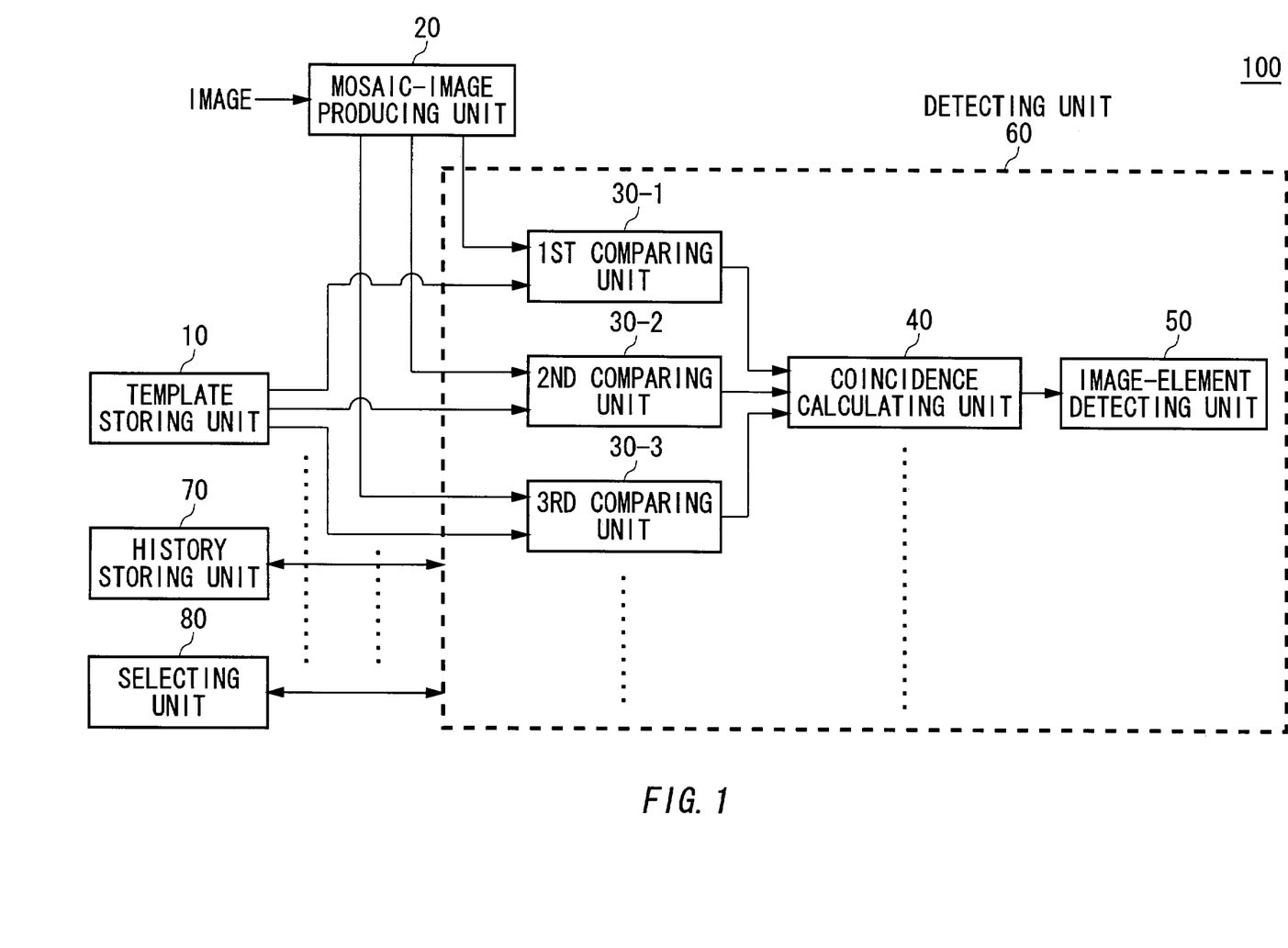
FIG. 1 illustrates an exemplary arrangement of an image processing apparatus according to the present invention.

FIG. 1 illustrates an exemplary arrangement of an image processing apparatus 100 according to the present invention. The image processing apparatus 100 detects a desired image from a given image, and includes a template storing unit 10, a mosaic-image producing unit 20, a detecting unit 60, a history storing unit 70 and a selecting unit 80.

The template storing unit 10 stores a plurality of templates showing the entire desired image-element or a part thereof. It is preferable that the template storing unit 10 stores a plurality of templates each has a lower resolution than that of the desired image-element, that are produced based on the desired image-element. For example, the template storing unit 10 stores a mosaic image of the desired image-element as the template. In this example, the template storing unit 10 stores a plurality of first templates each showing the entire desired image-element and a plurality of second templates each having a lower resolution than that of the first template and showing a part of the first template, and a plurality of third templates each having a lower resolution than that of the second template and showing a part of the second template.

The template storing unit 10 stores the second templates in such a manner that each second template is stored so as to be associated with any of the first templates. Moreover, the template storing unit 10 stores the second template that is made to correspond to a plurality of first templates and that shows a part of any of the first templates. For example, the template storing unit 10 stores each second template so as to be associated with a plurality of first templates. Similarly, the template storing unit 10 stores each of the third templates so as to be associated with any of the second templates.

The template storing unit 10 may each third template so as to be associated with a plurality of second templates. In this example, the template storing unit 10 stores a plurality of first templates showing faces of a plurality of persons; stores second templates showing elements of face such as an eye, a nose, and a mouth in such a manner that each second template is associated with any of the first templates; and stores third templates showing details of the eye, nose and mouth in such a manner that each third template is associated with any of second templates.

The mosaic-image producing unit 20 produces, based on a given image, an image having a lower resolution than that of the given image, i.e., a mosaic image. The mosaic-image producing unit 20 may produce a plurality of mosaic images having different resolutions. For example, the mosaic-image producing unit 20 may produce the first mosaic image having approximately the same resolution as that of the first template, the second mosaic image having approximately the same resolution as that of the second template and the third mosaic image having approximately the same resolution as that of the third template.

Moreover, the mosaic-image producing unit 20 may produce a mosaic image of a part of the given image. For example, the mosaic-image producing unit 20 may produce the mosaic image by extracting a part of the given image so that the number of pixels of the template stored in the template storing unit 10 is approximately the same as the number of pixels of the mosaic image. In this example, the mosaic-image producing unit 20 produces the first mosaic image having approximately the same number of pixels as that of pixels of the first template, the second mosaic image having approximately the same number of pixels as that of pixels of the second template and the third mosaic image having approximately the same number of pixels as that of pixels of the third template.

The detecting unit 60 detects a desired image-element from the given image by using any of a plurality of templates stored in the template storing unit 10. The detecting unit 60 compares the mosaic image produced by the mosaic-image producing unit 20 with the template stored by the template storing unit 10 so as to detect the desired image-element from the given image based on the comparison result. The detecting unit 60 includes a plurality of matching means for comparing the mosaic image produced by the mosaic-image producing unit 20 with the template stored in the template storing unit 10. For example, the detecting unit 60 may compare the template with the mosaic image by a method based on the sum of differences between corresponding pixels of the template and the mosaic image, a method based on the distance of pixel-value vector between the template and the mosaic image, or the like. Moreover, the detecting unit 60 may compare the template with the mosaic image based on the eigenspace method, the kernel-based method, or the like.

The history storing unit 70 stores a used history of the template that was used by the detecting unit 60. For example, the history storing unit 70 stores the number of times the detecting unit 60 used the template for each of a plurality of templates. The history storing unit 70 may store the used history of the template in a predetermined period. For example, the history storing unit 70 may store which template was used by the detecting unit 60 and the number of times that template was used in a predetermined period.

The history storing unit 70 may store a time at which each of the templates was used last by the detecting unit 60. The history storing unit 70 may store the detection result in the detecting unit 60 for each of a plurality of templates. For example, the history storing unit 70 may store the number of times each template was used and the number of times the detecting unit 60 detected the desired image-element by using each template. The detecting unit 60 may select any of a plurality of templates stored in the template storing unit 10 based on the used histories stored in the history storing unit 70.

The selecting unit 80 selects any of a plurality of matching means in the detecting unit 60. For example, the selecting unit 80 selects any of a plurality of matching means in the detecting unit 60 based on the number of pixels of the given image. The selecting unit 80 may select any of a plurality of matching means in the detecting unit 60 based on whether the given image is monochrome or color.

The detecting unit 60 includes the first comparing unit 30-1, the second comparing unit 30-2, the third comparing unit 30-3, a coincidence calculating unit 40 and an image-element detecting unit 50.

The first comparing unit 30-1 calculates the coincidence between the first template of a plurality of templates stored in the template storing unit 10 and the first mosaic image produced by the mosaic-image producing unit 20. The first comparing unit 30-1 has a plurality of matching means described before for calculating the coincidence between the first template and the first mosaic image. For example, the first comparing unit 30-1 may calculate the coincidence between the first template and the first mosaic image by a matching means using a method based on the sum of differences of pixel values between corresponding pixels of the first template and the first mosaic image, a method based on the distance of pixel value vector between the first template and the first mosaic image, and the like. The first comparing unit 30-1 may calculate the coincidence between the first template and the first mosaic image by a matching means using the eigenspace method, the kernel-based method or the like. The selecting unit 80 selects any of the above-mentioned matching means, and the first comparing unit 30-1 calculates the coincidence between the first template and the first mosaic image based on the selected matching means.

The first comparing unit 30-1 may calculate the coincidence between the first template that corresponds to a desired image-element and the first mosaic image. Moreover, the first comparing unit 30-1 selects the first template to be used, based on the used histories of a plurality of first templates stored in the history storing unit 70.

The first comparing unit 30-1 may calculate the coincidence between each of all the first templates stored in the template storing unit 10 and the first mosaic image. In this case, the first comparing unit 30-1 may output the highest one of the calculated coincidences. Moreover, the first comparing unit 30-1 may calculate the coincidence(s) between one or ones of a plurality of first templates stored in the template storing unit 10, that is/are specified by a user, and the first mosaic image. In addition, the template storing unit 10 stores a plurality of first templates in such a manner that the first templates are classified into a plurality of groups, and the first comparing unit 30-1 may calculate the coincidences between the first templates in one or a plurality of groups specified by the user and the first mosaic image. Also in this case, the first comparing unit 30-1 may output the highest one of the calculated coincidences to the coincidence calculating unit 40.

The second comparing unit 30-2 calculates the coincidence between the second template having a higher resolution than that of the first template, that shows a part of the first template, and the second mosaic image having a higher resolution than that of the first mosaic image, that was produced by the mosaic-image producing unit 20. The second comparing unit 30-2 calculates the coincidence between the second template that was made to correspond to the first template used by the first comparing unit 30-1 and the second mosaic image. Alternatively, the second comparing unit 30-2 selects any of the second templates that were made correspond to the first template used by the first template so as to calculate the coincidence with the selected second template and the second mosaic image. The second comparing unit 30-2 may select a plurality of second templates. The second comparing unit 30-2 may select the second template based on the used histories of the second templates stored in the history storing unit 70.

The second comparing unit 30-2 may output all the calculated coincidences to the coincidence calculating unit 40. For example, the second comparing unit 30-2 calculates the coincidences between the respective second templates showing an eye, nose or mouth and the second mosaic image so as to output all the calculated coincidence to the coincidence calculating unit 40.

The second comparing unit 30-2 may calculate the coincidences between all the second templates that were made to be associated with the first template corresponding to the coincidence output from the first comparing unit 30-1 to the coincidence calculating unit 40, and the second mosaic image. In this case, the second comparing unit 30-2 may output the highest one of the calculated coincidences to the coincidence calculating unit 40, like the first comparing unit 30-1.

The second comparing unit 30-2 has a plurality of matching means like the first comparing unit 30-1. The second comparing unit 30-2 may calculate the coincidence between the second template and the second mosaic image by using the matching means selected by the selecting unit 80.

Similarly, the third comparing unit 30-3 calculates the coincidence between the third template having a higher resolution than that of the second template, that shows the entire second template or a part of the second template, and the third mosaic image produced by the third image producing image 20. The third comparing unit 30-3 may select the third template to be used from the third plates associated with the second template that corresponds to the coincidence output from the second comparing unit 30-2 to the coincidence calculating unit 40, so as to calculate the coincidence between the third template thus selected and the third mosaic image. Alternatively, the third comparing unit 30-3 may calculate the coincidences between all the third templates associated with the second template that corresponds to the coincidence output from the second comparing unit 30-2 to the coincidence calculating unit 40, and the third mosaic image. Moreover, the third comparing unit 30-3 may select the third template to be used based on the used histories of the respective third templates stored in the history storing unit 70.

The third comparing unit 30-3 has a plurality of matching means, like the first comparing unit 30-1. The third comparing unit 30-3 may calculate the coincidence between the third template and the third mosaic image by using the matching means selected by the selecting unit 80.

The selecting unit 80 may select a matching means for each of a plurality of comparing units 30 independently of the matching means for the other comparing unit. That is, the selecting unit 80 may select different matching means or the same matching means for a plurality of comparing units 30.

The coincidence calculating unit 40 calculates the coincidence between a desired image-element and a given image based on all the received coincidences. In this example, the coincidence calculating unit 40 calculates the coincidence between the desired image-element and the given image based on the coincidences that the first, second and third comparing units 30-1, 30-2 and 30-3 calculated and output, respectively.

The image-element detecting unit 50 detects the desired image-element from the given image based on the coincidence calculated by the coincidence calculating unit 40. In a case where the coincidence calculated by the coincidence calculating unit 40 is larger than a predetermined threshold value, the image-element detecting unit 50 determines that the desired image element was detected from the given image.

It is preferable that the coincidence calculating unit 40 has a means for multiplying the coincidence calculated by the comparing unit 30-$n$ by a weight coefficient. In this example, the coincidence calculating unit 40 includes a means for multiplying the coincidence calculated by the first comparing unit 30-1 by the first weight coefficient, a means for multiplying the coincidence calculated by the second comparing unit 30-2 by the second weight coefficient and a means for multiplying the coincidence calculated by the third comparing unit 30-3 by the third weight coefficient. The coincidence calculating unit 40 may calculate the coincidence between the desired image-element and the given image based on the sum of the coincidences which were multiplied by the weight coefficients.

The image processing apparatus 100 in this example can select an appropriate template efficiently because a plurality of templates are made to correspond to any of higher order templates. Moreover, the image processing apparatus 100 in this example can reduce leak in detection in each of a plurality of stages because the coincidence between the desired image-element and the given image is calculated based on all the coincidences calculated in a plurality of stages.

Figure 2:
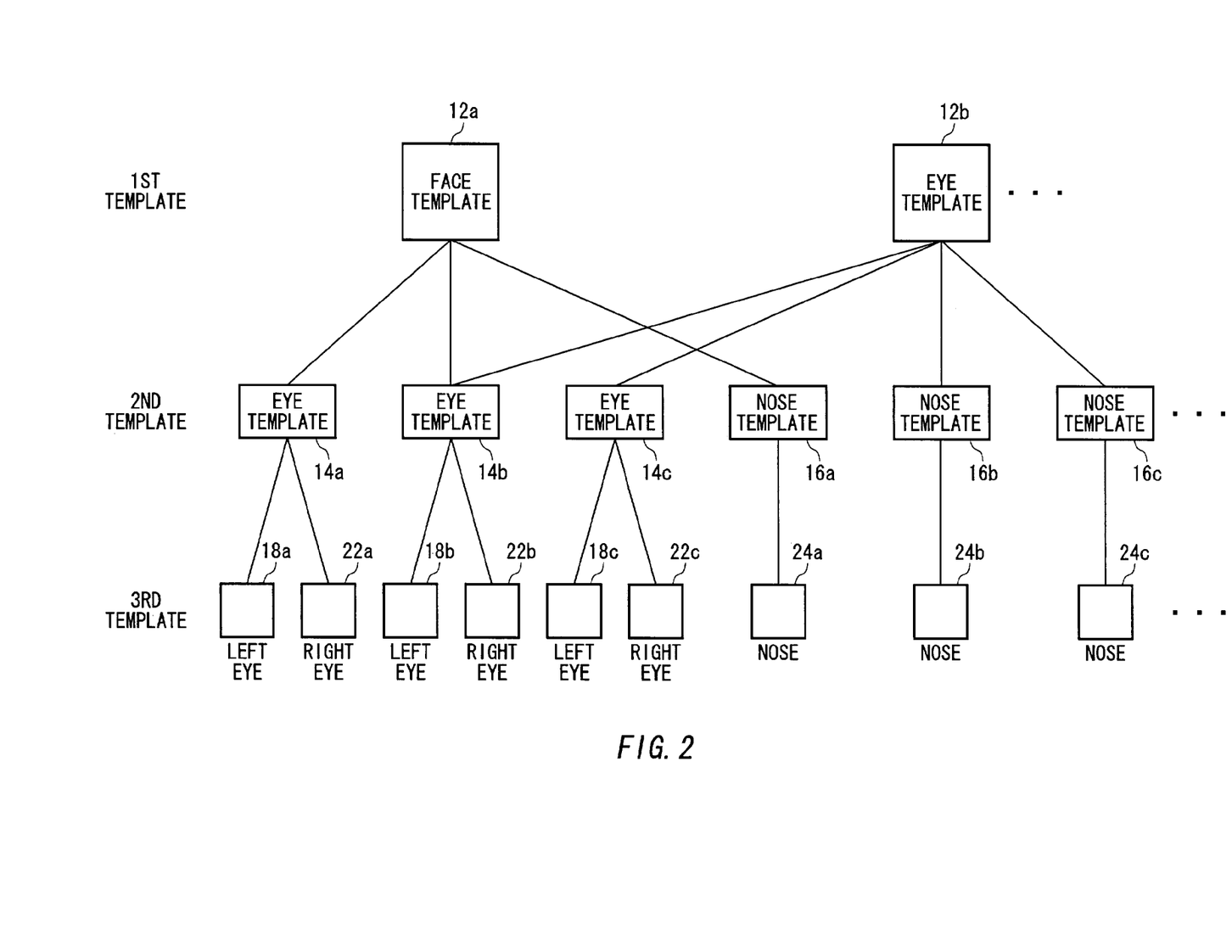
FIG. 2 shows an exemplary data structure of a template stored by a template storing unit.

FIG. 2 shows an exemplary data structure of the template stored in the template storing unit 10. The template storing unit 10 stores a plurality of templates. The template storing unit 10 stores a plurality of templates as a hierarchical data structure having a plurality of layers. In this example, the template storing unit 10 stores a plurality of templates in form of three-layered data hierarchy, as shown in FIG. 2. In addition, the template storing unit 10 in this example stores templates each showing a face a person as the first templates 12, templates each showing an eye or a nose of a person as the second templates 14, 16 and templates each showing a part of the second template 14, 16 as the third templates 18, 22 and 24.

The template storing unit 10 stores the lower template so as to correspond to any of upper templates, as described above. In this example, the second template 14a is made to correspond to the first template 12a and the first template 12b. The template storing unit 10 may store the upper template so as to correspond to a plurality of lower templates. In other words, the template storing unit 10 may store at least one first template 12 that corresponds to a plurality of second template 14. In this example, the first template 12a is made to correspond to the second template 14a and the second template 14b.

Moreover, the template storing unit 10 may store a template so as to correspond to any of other templates in the same layers of hierarchy. In this example, the template storing unit 10 stores at least second template that corresponds to another second template. For example, the template storing unit 10 may store the second template 14a showing an eye so as to correspond to any of the second templates 16 each showing a nose. In this case, the second comparing unit 30-2 may calculate the coincidences between a plurality of second templates made to correspond to each other and the second mosaic images, respectively.

In addition, the template storing unit 10 may store a plurality of second templates having a predetermined relationship therebetween. In this example, the template storing unit 10 stores an interrelationship of positions shown by the respective second templates 14, 16 as that relationship. The second comparing unit 30-2 may calculate the coincidence between the second template and the second mosaic image based on that relationship.

Figure 3:
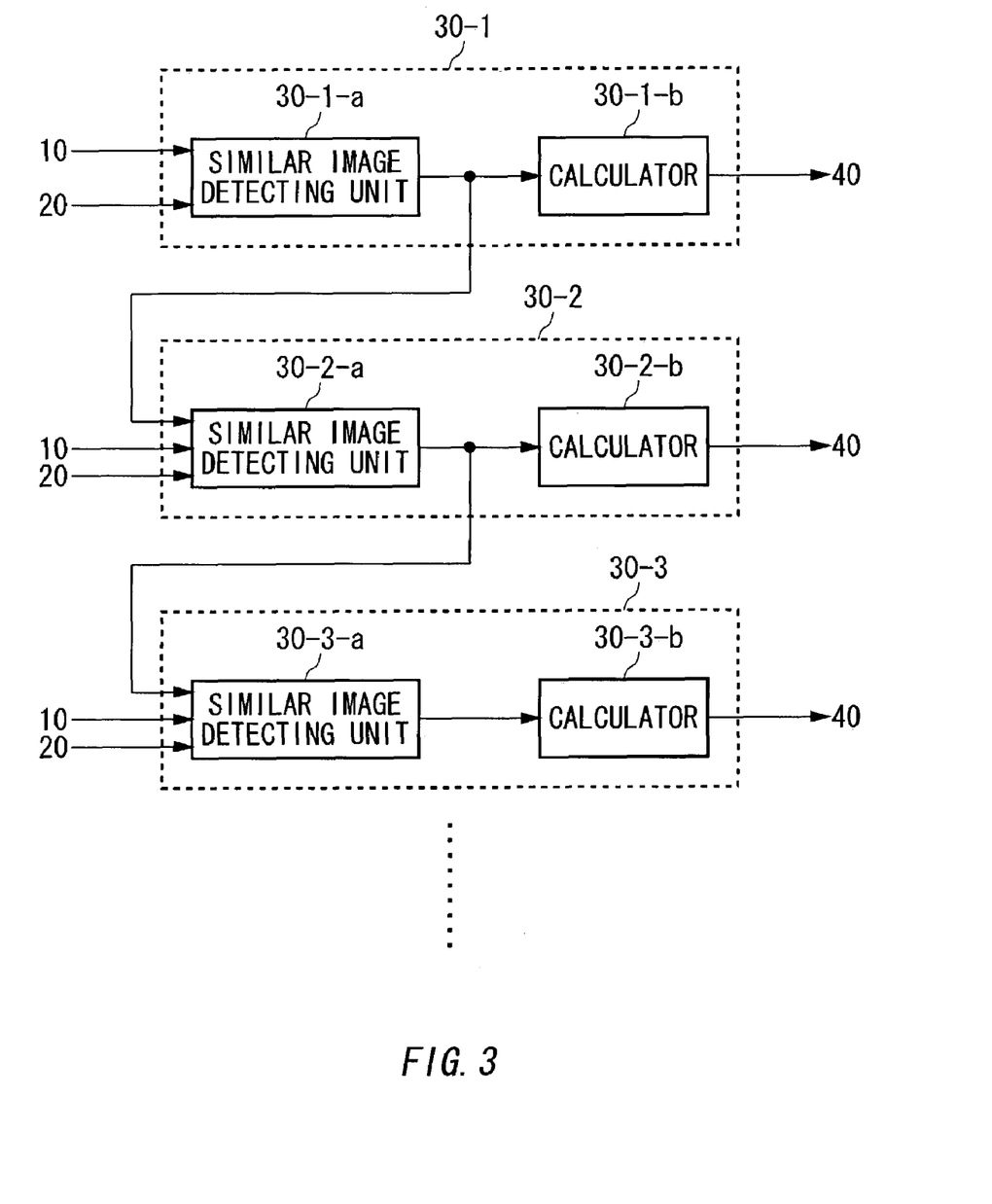
FIG. 3 shows an exemplary arrangement of each of a plurality of comparing units.

FIG. 3 shows an exemplary arrangement of each of a plurality of comparing units 30-n. Each comparing unit 30-n includes a similar image detecting unit 30-n-a and a calculator 30-n-b. The similar image detecting unit 30-1-a receives the first mosaic image and the first template, and detects from the first mosaic image a similar image-element that is similar to the first template. The calculator 30-1-b calculates the coincidence between the similar image-element detected by the similar image detecting unit 30-1-a and the first template. In another exemplary arrangement, the calculator 30-1-b may calculate the coincidence with the first template in each of a plurality of areas of the first mosaic image, and the similar image detecting unit 30-1-a may detect the area having the coincidence that is larger than a predetermined threshold value as the similar image-element. The comparing unit 30-1-a outputs the coincidence between the similar image-element and the first template to the coincidence calculating unit 40. Moreover, the similar image detecting unit 30-1-a outputs the position in the first mosaic image, at which the similar image-element was detected, to the second comparing unit 30-1.

The second comparing unit 30-2 has the same or similar function and structure as/to those of the first comparing unit 30-1. The similar image calculating unit 30-2-a receives the second mosaic image and the second template, and detects from this second mosaic image the similar image-element that is similar to the second template. The calculator 30-2-b calculates the coincidence between the similar image-element detected by the similar image detecting unit 30-2-a and the second template. The similar image detecting unit 30-2-a may detect the similar image-element from the second mosaic image based on the position at which the first similar image detecting unit 30-1-a detected the similar image-element.

In another exemplary arrangement, the calculator 30-2-b may calculate the coincidence with the second template in each of a plurality of areas of the second mosaic image and the calculator 30-2-a may detect the area having the coincidence that is larger than a predetermined threshold value as the similar image-element. The comparing unit 30-2 outputs the coincidence between the similar image-element and the second template to the coincidence calculating unit 40. Moreover, the similar image detecting unit 30-2-a outputs the position in the second mosaic image, at which the similar image was detected, to the third comparing unit 30-3.

The third comparing unit 30-3 has the same or similar function and structure as/to those of the second comparing unit 30-2. The similar image calculating unit 30-3-a receives the third mosaic image and the third template, and detects from this third mosaic image a similar image-element that is similar to the third template. The calculator 30-3-b calculates the coincidence between the similar image-element detected by the similar image detecting unit 30-3-a and the third template. The similar image detecting unit 30-3-a may detect the similar image-element from the third mosaic image based on the position at which the first similar image detecting unit 30-1-a detected the similar image-element.

In another exemplary arrangement, the calculator 30-3-b may calculate the coincidence with the third template in each of a plurality of areas of the third mosaic image and the calculator 30-3-a may detect the area having the coincidence that is larger than a predetermined threshold value as the similar image-element. The comparing unit 30-3 outputs the coincidence between the similar image-element and the third template to the coincidence calculating unit 40.

In addition, a plurality of comparing units 30-n have means for performing rotation, magnifying and/or size-reduction of the template or mosaic image that was received. The comparing unit 30-n may calculate the coincidence based on the template or mosaic image thus rotated, magnified and/or reduced in size.

Figure 4A:
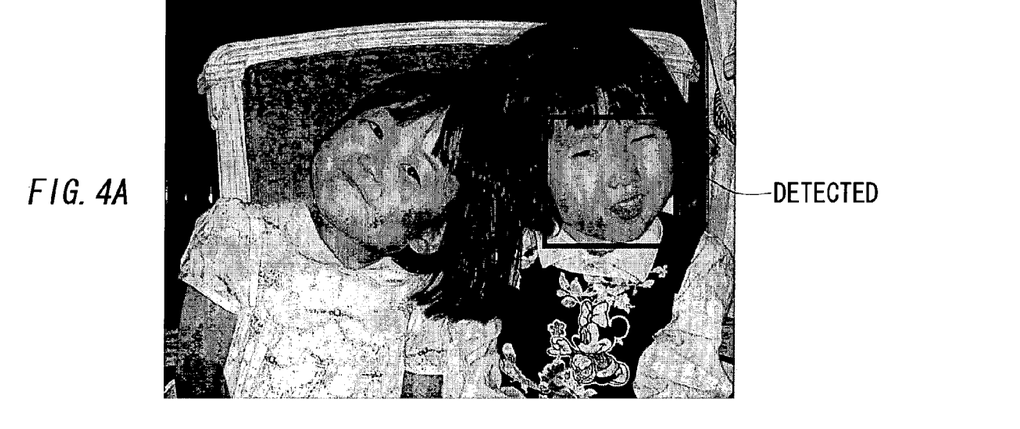
FIGS. 4A and 4B show an operation for detecting a coincidence in the image processing apparatus.
Figure 4B:
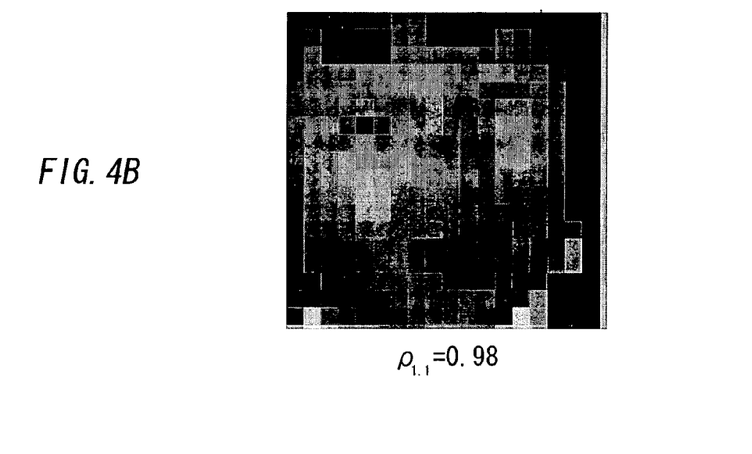

FIGS. 4A and 4B show an operation for detecting the coincidence in the image processing apparatus 100. In this example, the image processing apparatus 100 calculates the coincidence between a face of a person as a desired image-element and a given image. FIG. 4A shows an image given to the mosaic-image producing unit 20. The mosaic-image producing unit 20 produces the first mosaic image based on the given image and supplies the first mosaic image to the first comparing unit 30-1 described referring to FIG. 1. It is desirable that the mosaic-image producing unit 20 produce the first mosaic image having approximately the same resolution as that of the first template stored in the template storing unit 10.

The first storing unit 30-1 detects a similar image-element that is similar to the face of person from the first mosaic image based on the first template, as described referring to FIG. 3. In this example, the first comparing unit 30-1 detects the similar image-element at a position shown in FIG. 4A. FIG. 4B shows the similar image-element detected by the first comparing unit 30-1. The first comparing unit 30-1 calculates the coincidence between the first mosaic image and the first template based on the thus detected similar image-element. In this example, the first comparing unit 30-1 calculates the coincidence between the first mosaic image and the first template, $\rho_{1,1}$=0.98. Please note that the coincidence $\rho$ in this example has a value of 1 in a case where the mosaic image and the template are fully coincident with each other and has a value of 0 in a case where they are not coincident.

Figure 5A:
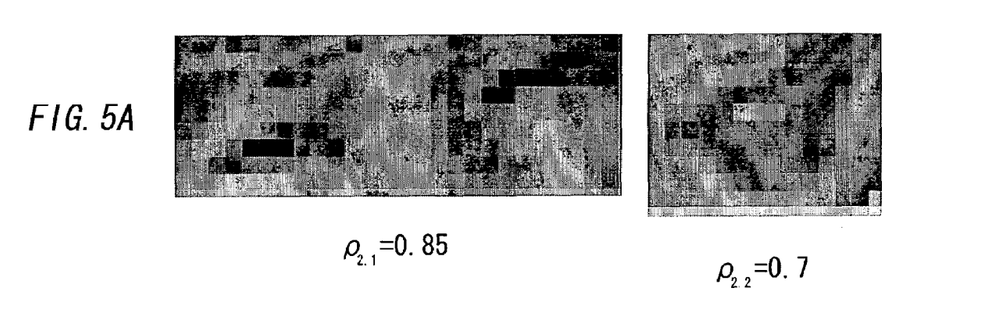
FIGS. 5A, 5B and 5C show an operation for detecting the coincidence, that follows the operation shown in FIGS. 4A and 4B.
Figure 5B:
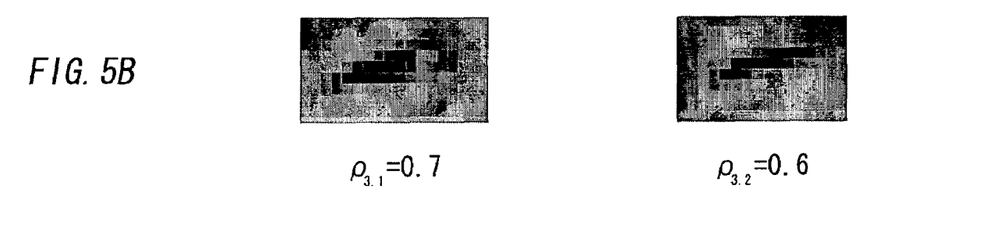
Figure 5C:
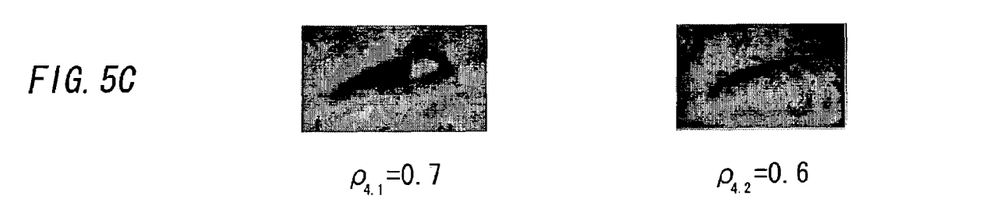

FIGS. 5A, 5B and 5C show an operation following the coincidence detection described in FIGS. 4A and 4B. The mosaic-image producing unit 20 produces the second mosaic image based on the given image, and supplies the second mosaic image to the second comparing unit 30-1 described referring to FIG. 1. It is desirable that the mosaic-image producing unit 20 produce the second mosaic image having approximately the same resolution as that of the second template stored in the template storing unit 10. The mosaic-image producing unit 20 may produce the second mosaic image based on the position in the given image at which the first comparing unit 30-1 detected the similar image-element. That is, the mosaic-image producing unit 20 may produce the second mosaic image showing a part of the first mosaic image based on the given image. Moreover, the mosaic-image producing unit 20 may produce the second mosaic image obtained by changing all areas in the given image to mosaic areas.

The second comparing unit 30-2 detects a similar image-element that is similar to a human face element, from the second mosaic image based on the second template, described referring to FIG. 3. The second comparing unit 30-2 may detect a plurality of similar image-elements. In this example, the second comparing unit 30-2 detects areas showing eyes and a nose as the similar image-elements from the second mosaic image. FIG. 5A shows the similar image-elements detected by the second comparing unit 30-2. The second comparing unit 30-2 calculates the coincidence between the second mosaic image and the second template based on the thus detected similar image-elements. In this example, the second comparing unit 30-2 calculates the coincidence between the second mosaic image and the second template, $\rho_{2,1}=0.85$ and $\rho_{2,2}=0.7$.

The mosaic-image producing unit 20 produces the third mosaic image based on the given image, and supplies the third mosaic image to the third comparing unit 30-3 described referring to FIG. 1. It is desirable that the mosaic-image producing unit 20 produce the third mosaic image having approximately the same resolution as that of the third template stored in the template storing unit 10. The mosaic-image producing unit 20 may produce the third mosaic image based on the position in the given image at which the second comparing unit 30-2 detected the similar image-element. That is, the mosaic-image producing unit 20 may produce the third mosaic image showing a part of the second mosaic image based on the given image. Moreover, the mosaic-image producing unit 20 may produce the third mosaic image obtained by changing all areas in the given image to mosaic areas. Furthermore, the mosaic-image producing unit 20 may produce the third mosaic image having a higher resolution than that of the second mosaic image, that shows an approximately the same area as that of the second mosaic image in the given image.

The third comparing unit 30-3 detects a similar image-element that is similar to a human face element, from the third mosaic image based on the third template, described referring to FIG. 3. The third comparing unit 30-3 may detect a plurality of similar image-elements. In this example, the third comparing unit 30-3 detects areas showing eyes and a nose as the similar image-elements from the third mosaic image. FIG. 5B shows the similar image-elements detected by the third comparing unit 30-3. The third comparing unit 30-3 calculates the coincidence between the third mosaic image and the third template based on the thus detected similar image-elements. In this example, the third comparing unit 30-3 calculates the coincidences between the third mosaic image and the third template, $\rho_{3,1}=0.7$ and $\rho_{3,2}=0.6$.

Although the image processing apparatus 100 described referring to FIGS. 1-3 includes three comparing units 30, the image processing apparatus 100 in an alternative example includes four or more comparing units 30. For example, the image processing apparatus 100 may further includes the fourth comparing unit. In this case, the mosaic-image producing unit 20 produces the fourth mosaic image having a higher resolution than that of the third mosaic image and supplies the fourth mosaic image to the fourth calculator. FIG. 5C shows an example of the fourth mosaic image. The fourth comparing unit calculates the coincidence between the fourth mosaic image and the fourth template, like the third comparing unit 30-3. In this example, the fourth comparing unit calculates the coincidences between the fourth mosaic image and the fourth template, $\rho_{4,1}=0.7$ and $\rho_{4,2}=0.6$.

Each of a plurality of comparing units has a plurality of matching means for calculating the coincidence, as described above. Each comparing unit uses any of the matching units so as to calculate the coincidence.

The coincidence calculating unit 40 described referring to FIG. 1 calculates the coincidence between the desired image-element and the given image based on all the coincidences calculated by the first through third calculators 30-1, 30-2 and 30-3 and the fourth calculator. For example, the coincidence calculating unit 40 calculates the coincidence $P_{SOF}$ between the desired image-element and the given image in accordance with the following equation.

$$P_{SOF} = \sum_{i} \rho_{1,i} \left( g_1 + \sum_{j} \rho_{2,j} \left( g_2 + \sum_{k} \rho_{3,k} \left( g_3 + \sum_{l} \rho_{4,l} \times g_4 \right) \right) \right)$$

Equation 1

In the above equation, $g_1$, $g_2$, $g_3$ and $g_4$ represent the first, second, third and fourth weight coefficients, respectively.

As indicated in the above equation, by multiplying the coincidence $\rho$ calculated in the lower layer by the coincidence $\rho$ calculated in the upper layer, leak in the detection based on the coincidence $\rho$ in a specific layer can be reduced. Moreover, by assigning appropriate values to the respective weight coefficients, it may be selected whether the coincidence in the upper layer, i.e., the layer of lower resolution or the coincidence in the lower layer, i.e., the layer of higher resolution is emphasized when the desired image is detected. The image processing apparatus 100 preferably has a means for changing a value of the weight coefficient based on the user's instruction. For example, the image processing apparatus 100 may make the value of the weight coefficient in the lower layer larger in a case where the user wants to detect a face of a specified person, and may make the value of the weight coefficient in the upper layer larger in a case where the user wants to detect a face of an unspecified person. Moreover, the image processing apparatus 100 may calculate the coincidence between the desired image and the given image in accordance with another equation based on all the coincidences calculated by the comparing units 30.

The image-element detecting unit 50 described referring to FIG. 1 may detect a desired image-element from a given image based on the coincidence $P_{SOF}$ calculated by the coincidence calculating unit 40. The image-element detecting unit 50 detects the similar image detected by the first comparing unit 30-1 as the desired image-element in a case where the coincidence $P_{SOF}$ exceeds a predetermined threshold value. According to the image processing apparatus 100 described in this example, leak or error in the detection can be reduced by calculating the coincidence $P_{SOF}$ based on all the coincidences calculated by the comparing unit 30.

Figure 6:
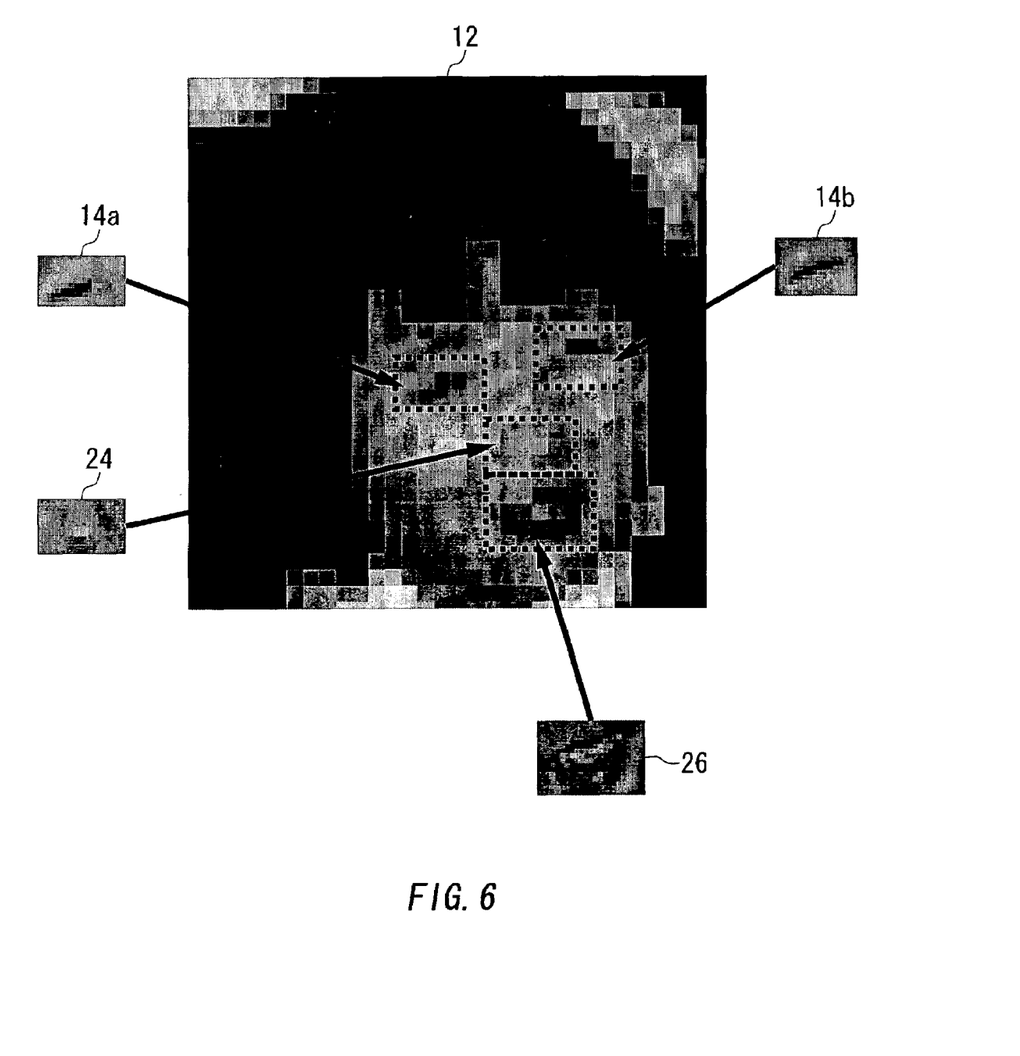
FIG. 6 shows an interrelationship between the templates stored in the template storing unit described referring to FIG. 3.

FIG. 6 shows the interrelationship between the templates stored in the template storing unit 10 described referring to FIG. 3. In this example, the template storing unit 10 stores the second templates 14, 24 and 26 so as to be associated with the first template 12. In this example, the template storing unit 10 stores the first template 12 showing a face of a person. Also, the template storing unit 10 stores the second templates 14a, 14b, 24 and 26 showing a right eye, a left eye, a nose and a mouth of a person, respectively.

Furthermore, the template storing unit 10 stores the interrelationship between the position of the right eye in the first template 12, that is indicated by the second template 14a, and the position of the left eye in the first template 12, that is indicated by the second template 14b as an interrelationship between positions in the first template that are respectively shown by a plurality of second templates. The template storing unit 10 stores X-coordinate displacement ΔX1 and Y-coordinate displacement ΔY1 from the right-eye position to the left-eye position as the interrelationship.

Similarly, the template storing unit 10 stores X-coordinate displacement ΔX2 and Y-coordinate displacement ΔY2 from the left-eye position to the nose position in the first template 12 as the interrelationship between the second template 14b and the second template 24. The template storing unit 10 stores X-coordinate displacement ΔX3 and Y-coordinate displacement ΔY3 from the nose-eye position to the mouth position in the first template 12 as the interrelationship between the second template 24 and the second template 26. The template storing unit 10 may calculate those coordinate displacements in a coordinate system in which a lower left corner of the first template 12 is an origin, and a right direction is an X-axis while an upward direction is a Y-axis. The image processing apparatus 100 described referring to FIG. 1 compares the mosaic image obtained from the given image with the above-described template so as to detect the desired image-element from the given image. Moreover, although the right-eye template and the left-eye template are stored as the second templates in this example, it is apparent that the template storing unit 10 can store a template showing both eyes as the second template in an alternative example, as shown in FIG. 2. The template storing unit 10 may store the interrelationship between the templates in a similar manner.

Figure 7A:
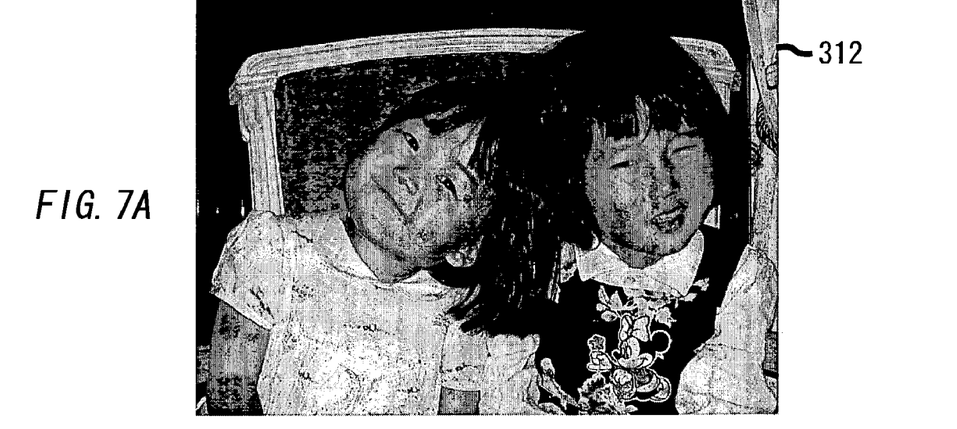
FIGS. 7A, 7B and 7C shows an exemplary operation for detecting a similar image-element in a similar image detecting unit described referring to FIG. 3.
Figure 7B:
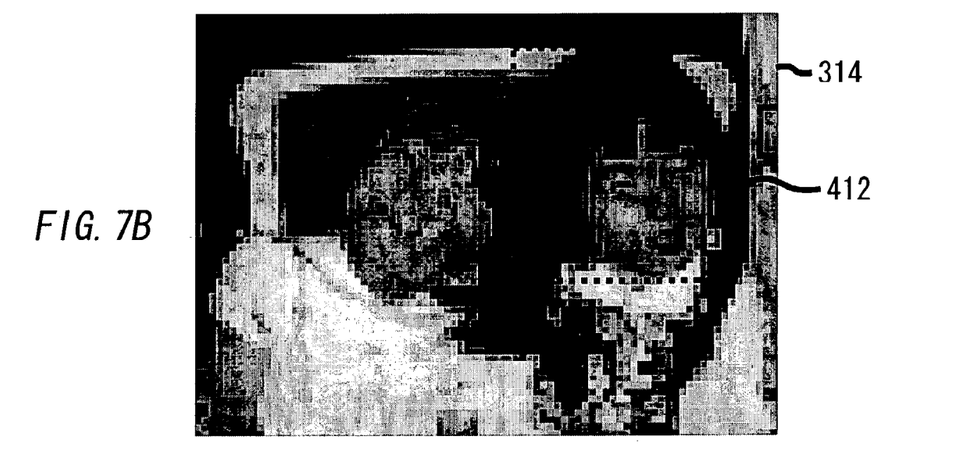
Figure 7C:
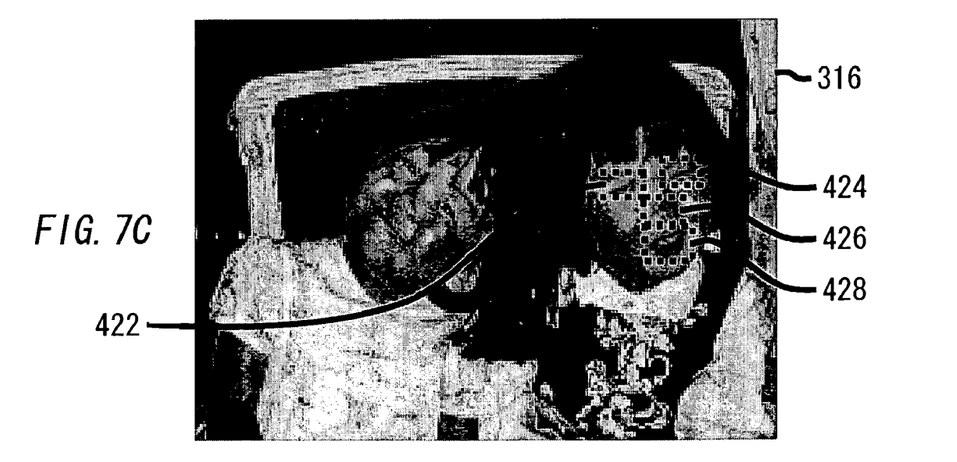

FIGS. 7A-7C explain an exemplary operation for detecting an similar image-element in the similar image detecting unit 30-1-n described referring to FIG. 3. The similar image detecting unit 30-1-n detects the first similar image-element that is similar to the first template and the second similar image-element that is similar to the second template, from the given image.

FIG. 7A shows a given image 312 that is an image to be processed in which the desired image-element is to be detected. The given image 312 may be an image has background other than an objet to be detected, for example.

FIG. 7B shows the first mosaic image 314 produced by the mosaic-image producing unit 20 described referring to FIG. 1 based on the given image and the first similar image-element 412 detected in the first mosaic image by the first similar image detecting unit 30-1-a described referring to FIG. 3. In the present embodiment, the first similar image detecting unit 30-1-a detects the first similar image-element 412 in the first mosaic image 314, that is similar to the first template 12 shown in FIG. 6. In the present embodiment, the first mosaic image 314 shows the entire given image 312. In an alternative example, the first mosaic image 314 may show a part of the given image 312.

FIG. 7C shows the second mosaic image 316 produced based on the given image 312, and the second similar image-elements 422, 424, 426 and 428 detected in the second mosaic image by the second similar image detecting unit 30-2-a described referring to FIG. 3. In the present embodiment, the second similar image detecting unit 30-2-a detects in the second mosaic image 316 the second similar image-elements 422, 424, 426 and 428 that are similar to the second templates 14a, 14b, 24 and 26, as shown in FIG. 6, respectively. In the present embodiment, the second mosaic image 316 shows the entire given image 312. In an alternative example, the second mosaic image 316 may show a part of the given image 312.

According to the image processing unit 100 in the present embodiment, the template storing unit 10 stores the interrelationship between the positions in the first template, respectively shown by a plurality of second templates. Therefore, the similar image-element can be detected in a reduced process time. Moreover, according to the image processing apparatus 100 in the present embodiment, the template storing unit 10 stores a plurality of first templates and the second template that is made to be associated with each first template. Therefore, it is possible to select an appropriate second template in accordance with the detection result of the first similar image-element. Thus, according to the image processing apparatus 100 in the present embodiment, it is possible to detect the similar image-element for various types of object images with high precision and high speed.

A plurality of comparing units 30 may calculate the aforementioned coincidences further based on the interrelationships between the similar image-elements detected by the corresponding similar image detecting units 30-n-a and errors between the templates stored in the template storing unit 10 and the interrelationships. For example, the comparing unit 30 may calculate the coincidence further based on an error between a relative position of the template stored in the template storing unit 10 and a relative position of the similar image-element detected by the corresponding similar image detecting unit 30-n-a. Moreover, the template storing unit 10 may store the position in the upper position, of the lower template. In this case, the comparing unit 30 may calculate the aforementioned coincidence further based on the detected similar image-element. In the following description, a case where the coincidence is calculated based on the position of the similar image-element is described.

Figure 8:
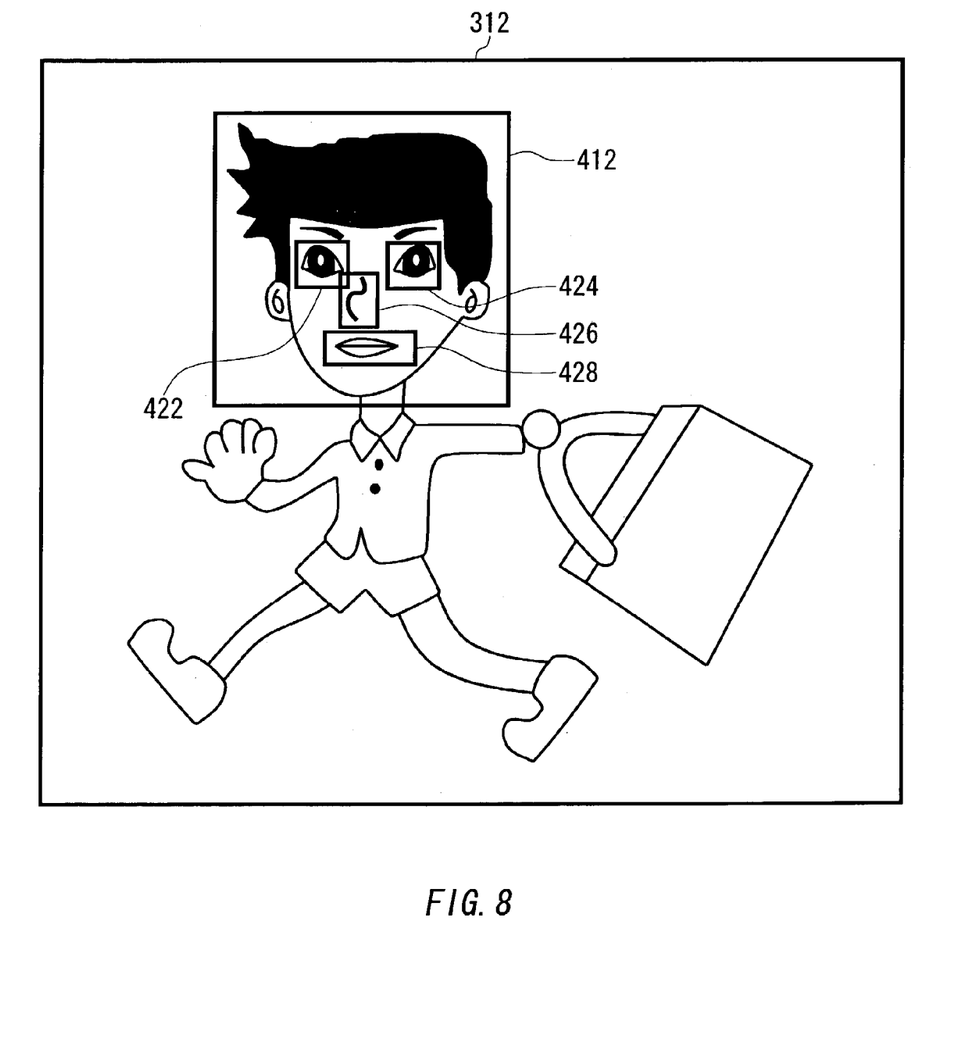
FIG. 8 shows a case of calculating the coincidence based on a position of the similar image-element.

FIG. 8 shows the case of calculating the coincidence based on the position of the similar image-element. The first similar image-element detecting unit 30-1-a described referring to FIG. 3 detects the first similar image-element 412 that is similar to the first template, from a given image 312. The first similar image-element detecting unit 30-1-a supplies information regarding the position in the given image of the first similar image-element 412 thus detected to the second similar image-element detecting unit 30-2-a and the calculator 30-1-b.

The second similar image-element detecting unit 30-2-a detects the similar image-elements 422, 424, 426 and 428 that are similar to the second template, from the given image 312. The second similar image-element detecting unit 30-2-*a* may detect the second similar image-elements 422, 424, 426 and 428. In addition, the second similar image-element detecting unit 30-2-*a* may detect the second similar image-elements 422, 424, 426 and 428 from an area near a reference position stored by the template storing unit 10.

In this example, the second similar image-element detecting unit 30-2-*a* detects image-elements showing a right eye, a left eye, a nose and a mouth as the second similar image-elements 422, 424, 426 and 428, respectively. The second similar image-element detecting unit 30-2-*a* supplies information regarding the positions in the given image of the second similar image-elements 422, 424, 426 and 428 thus detected to the calculator 30-2-*b*.

The calculator 30-*n*-*b* calculates the aforementioned coincidence based on the information regarding the similar image-element detected by the similar image-element detecting unit 30-*n*-*a*. For example, the calculator 30-*n*-*b* may determine, based on the distance the position of the similar image-element detected by the similar image-element detecting unit 30-*n*-*a* and the reference position stored in the template storing unit 10, whether or not the similar image-element is detected as a desired image-element. Moreover, the calculator 30-*n*-*a* may calculate the coincidence further based on the relative positions in the given image of a plurality of similar image-elements detected by the similar image-element detecting unit 30-*n*-*a*. According to the image processing apparatus 100 described above, the error in detection can be further reduced and it is also possible to detect the desired image-element with high precision.

As described above, a plurality of comparing units 30 each has a plurality of matching means for comparing a given image and a desired image-element. The comparing unit 30 calculates the coincidence between the given image and the desired image-element based on any of a plurality of matching means. The selecting unit 80 selects any of a plurality of matching means in each of the comparing units 30 based on information regarding the given image. The comparing units 30 calculate the coincidences between the given image and the desired image-element based on the respective selected matching means.

The selecting unit 80 may select any of a plurality of matching means in each comparing unit 30 based on the number of pixels of the given image. Moreover, the selecting unit 80 may select any of a plurality of matching means in each comparing unit 30 based on whether the given image is monochrome or color. In addition, the selecting unit 80 may select the matching means for each of a plurality of comparing units 30 independently of the selection for other comparing units 30. In other words, the selecting unit 80 may select different matching means or the same matching means in a plurality of comparing units 30.

In a case where the image processing apparatus 100 receives an image captured by an image-capturing apparatus as the given image, the selecting unit 80 may select any of a plurality of matching means based on an image-capturing condition under which that image was captured. For example, the selecting unit 80 may select any of a plurality of a plurality of matching means based on the date and time and the position at which that image was captured, the presence or absence of light emission by an electronic flash, optical and electronic magnification and the like.

Moreover, when the image processing apparatus 100 received digital image data of exif format as the given image, the selecting unit 80 may select any of a plurality of matching means based on APPI data of that digital image data. For example, the selecting unit 80 may select any of a plurality of a plurality of matching means based on the date and time and the position at which that image was captured, the presence or absence of light emission by an electronic flash, optical and electronic magnification, the number of pixels of that image, data indicating whether that image is monochrome or color, and the like, of APPI data.

Figure 9:
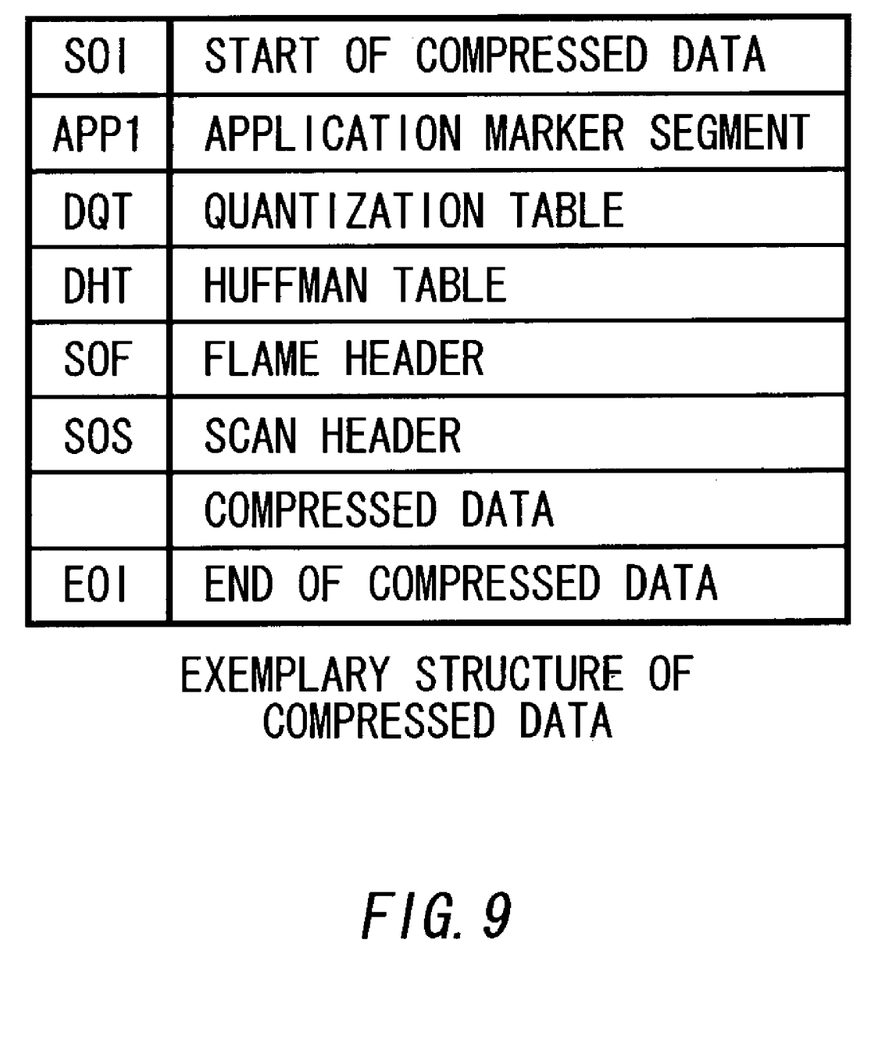
FIG. 9 shows an exemplary data structure of exif-format digital image data.

FIG. 9 shows an exemplary data structure of the exif-format digital image data. The exif-format digital image data includes SOI data, APPI data, DQT data, DHT data, SOF data, SOS data, compressed-data data and EOI data, as shown in FIG. 9. The SOI data shows the start of the compressed data; the APPI data shows an application marker segment; the DQT data shows a quantization table; the DHT date shows a Huffman table; the SOF date shows a flame header; the SOS data shows a scan header; the compressed-data data shows image data; and the EOI data shows the end of the compressed data.

When the image processing apparatus 100 received the exif-format digital image data, the selecting unit 80 may select any of a plurality of matching means based on the APPI data shown in FIG. 9. The APPI data shows the application marker segment indicating attribute information of the image data. The selecting unit 80 may select any of a plurality of a plurality of matching means based on the date and time and the position at which that image was captured, the presence or absence of light emission by an electronic flash, optical and electronic magnification, the number of pixels of that image, data indicating whether that image is monochrome or color, and the like, of APPI data.

According to the image processing apparatus 100 in this example, an appropriate matching means can be selected for each of a plurality of stages. Moreover, according to the image processing apparatus 100 in this example, an appropriate matching means can be selected for the given image. Furthermore, according to the image processing apparatus 100 in this example, it is possible to select the matching means for each of the templates used in comparison. Thus, the image processing apparatus 100 can detect the desired image-element from the given image efficiently with high precision. The image processing apparatus 100 described referring to FIGS. 1-9 may be a computer that stores a program for conducting the aforementioned image process, for example.

Figure 10:
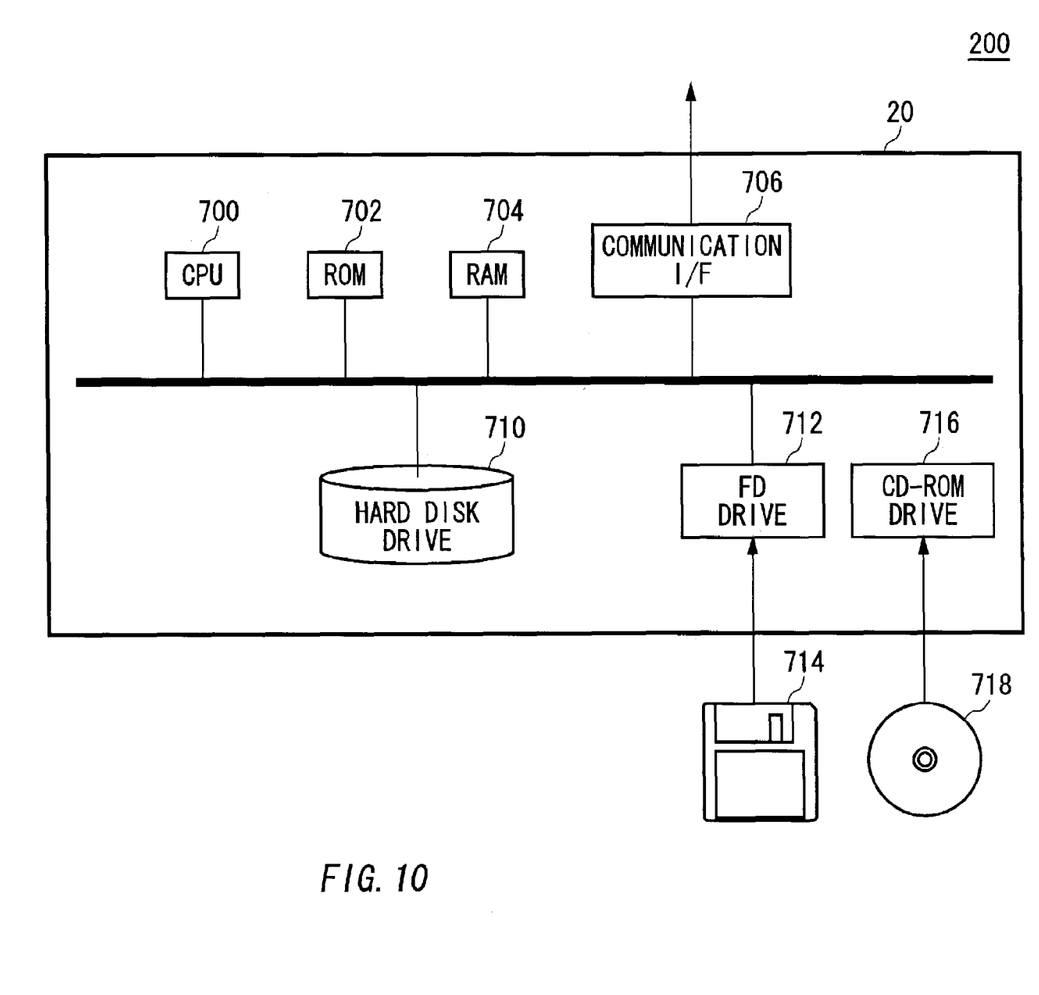
FIG. 10 illustrates an exemplary configuration of a computer as the image processing apparatus.

FIG. 10 shows an exemplary configuration of a computer 200 as the image processing apparatus 100. The computer 200 includes a CPU 700, a ROM 702, a RAM 704, a communication interface 706, a hard disk drive 710, an FD disk drive 712 and a CD-ROM drive 716. The CPU 700 operates at least one program stored in the ROM 702, the RAM 704, the hard disk drive 710, a floppy disk 714 and a CD-ROM 718. The communication interface 706 communicates with external equipment via the Internet or the like. The hard disk drive 710 as an exemplary storage device stores setting information and the program in accordance with which the CPU 700 operates. The ROM 702, the RAM 704 and/or the hard disk drive 710 stores an image processing program for making the computer 200 operate as the image processing apparatus 100 described referring to FIGS. 1-9.

The FD drive 712 reads data or a program from the floppy disk 714 and then supplies it to the CPU 700. The CD-ROM drive 716 reads data or a program from the CD-ROM 718 and then supplies it to the CPU 700. The communication interface 706 transmits/receives data while being connected to the Internet 10.

Software executed by the CPU 700 is supplied to a user while being stored in a recording medium such as the floppy disk 714 and CD-ROM 718. The software stored in the recording medium may be compressed or uncompressed. The software is installed from the recording medium into the hard disk drive 710, and is then read into the RAM 704 so as to be executed by the CPU 700.

The image processing program may make the computer 200 operate as the template storing unit 10, mosaic-image producing unit 20, comparing unit 30, coincidence calculating unit 40, image-element detecting unit 50, detecting unit 60, history storing unit 70 and selecting unit 80 described referring to FIGS. 1-9. In other words, in this example, the template storing unit 10 and the history storing unit 70 may be the RAM 704 or the hard disk drive 710. Alternatively, the template storing unit 10 and the history storing unit 70 may be the FD drive into which the FD disk is inserted or the CD-ROM drive 716 into which the CD-ROM 718 is inserted. Moreover, the mosaic-image producing unit 20, the comparing unit 30, the coincidence calculating unit 40, the image-element detecting unit 50, the detecting unit 60 and the selecting unit 80 may be the CPU 700. Furthermore, the computer 200 may further include another calculation device for performing the functions of the mosaic-image producing unit 20, comparing unit 30, coincidence calculating unit 40, image-element detecting unit 50, detecting unit 60 and selecting unit 80.

The computer 200 may receive an image from which a desired image is to be detected from the CD-ROM 718 and/or FD drive 716. The computer 200 may receive that image from the outside via the communication interface. The computer 200 may include a means for reading the image to be detected from a memory device that stores images in a digital camera.

The image processing program may be executed by being read from the recording medium directly to the RAM, or being read into the RAM after being installed into the hard disk drive. Moreover, the above program may be stored a single recording medium or a plurality of recording media. The image processing program may provide the respective functions by cooperation with an operating system. For example, the image processing program may ask the operating system to conduct a part of or all the functions and provide the function in accordance with a response from the operating system.

As the recording medium for storing the image processing program, an optical recording medium such as a DVD or PD, a magneto-optic recording medium such as an MD, a tape-like medium, a magnetic recording medium, a semiconductor memory such as an IC card or miniature card can be used other than the floppy disk and the CD-ROM. Moreover, a storage device such as a hard disk or RAM provided in a server system connected to an exclusive communication network or the Internet may be used as the recording medium. According to the computer of this example, it is possible to reduce the error in detection and to detect the desired image-element with high precision, like the image processing apparatus 100.

As described above, according to the present invention, it is possible to detect a desired image-element from a given image with high precision.

Although the present invention has been described by way of exemplary embodiments, it should be understood that those skilled in the art might make many changes and substitutions without departing from the spirit and the scope of the present invention which is defined only by the appended claims.

What is claimed is:

1. An image processing apparatus for detecting a desired image-element from a given image, comprising:
   a storing unit operable to store a plurality of first templates indicating said desired image-element and a plurality of second templates stored corresponding to said plurality of first templates, each of said second templates indicating a part of a corresponding one of said plurality of first templates;
   a first comparing unit operable to select any one of said first templates and compare said selected one first template with said given image; and
   a second comparing unit operable to compare only said second templates indicating a part corresponding to said selected one first template selected by said first comparing unit with said given image; and
   a detecting unit operable to detect said desired image-element from said given image based on the comparison results by said first and second comparing units,
   wherein the storing unit stores an interrelationship between a first position indicated by one of said second templates in said first template and a second position indicated by the other of said second templates in said first template.

2. An image processing apparatus as claimed in claim 1, wherein said storing unit stores at least one first template that corresponds to said plurality of second templates.

3. An image processing apparatus as claimed in claim 1, wherein said storing unit stores at least one second template that corresponds to other one of said second templates.

4. An image processing apparatus as claimed in claim 1, wherein said storing unit stores a second template that has a higher resolution than that of said corresponding first template.

5. An image processing apparatus as claimed in claim 1, further comprising a history storing unit, said history storing unit storing a used history of the template used by said detecting unit, wherein
   said first comparing unit selects the first template to be used, based on the used histories of a plurality of first templates stored in said history storing unit, and
   said second comparing unit selects the second template to be used, based on the used histories of the second templates stored in said history storing unit.

6. The image processing apparatus as claimed in claim 1, wherein the storing unit is adapted to store an interrelationship between the plurality of first templates and the plurality of second templates.

7. The image processing apparatus as claimed in claim 1, wherein the storing unit is adapted to store an interrelationship between positions in the first template respectively shown by a plurality of second templates.

8. The image processing apparatus as claimed in claim 1, wherein:
   said first comparing unit is configured to further calculate a first coincidence between said selected one first template and said given image;
   said second comparing unit is configured to further calculate one or more second coincidences between said second templates indicating a part corresponding to said selected one first template and said given image; and
   said detecting unit is configured to detect said desired image-element from said given image based on a coincidence between said desired image-element and said given image, said coincidence being acquired by using the sum of a first weight coefficient multiplied by said first coincidence and a second weight coefficient multiplied by said second coincidences.

\* \* \* \* \*